US012125651B2

(12) United States Patent
Yumiza et al.

(10) Patent No.: US 12,125,651 B2
(45) Date of Patent: Oct. 22, 2024

(54) SWITCH UNIT

(71) Applicant: TOYO DENSO KABUSHIKI KAISHA, Tokyo (JP)

(72) Inventors: Shogo Yumiza, Saitama (JP); Keisuke Komatsu, Saitama (JP)

(73) Assignee: TOYO DENSO KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/125,333

(22) Filed: Mar. 23, 2023

(65) Prior Publication Data

US 2023/0352254 A1 Nov. 2, 2023

(30) Foreign Application Priority Data

Mar. 31, 2022 (JP) ................................ 2022-058116

(51) Int. Cl.
*H01H 21/24* (2006.01)
*H01H 21/04* (2006.01)

(52) U.S. Cl.
CPC ............ *H01H 21/24* (2013.01); *H01H 21/04* (2013.01)

(58) Field of Classification Search
CPC .......... H01H 21/24; H01H 21/04; H01H 3/12; H01H 13/00; H01H 13/70; H01H 13/702; H01H 13/7006; H01H 2003/12; H01H 2009/02; H01H 2013/00; H01H 2013/02; H01H 2013/04; H01H 2013/50; H01H 13/14; H01H 13/50; H01H 13/52; H01H 23/00; H01H 23/04; H01H 2003/028; H01H 2003/08; H01H 2223/00
USPC .......................................................... 200/293
See application file for complete search history.

(56) References Cited

FOREIGN PATENT DOCUMENTS

JP 2000-268654 A 9/2000

*Primary Examiner* — Anthony R Jimenez
(74) *Attorney, Agent, or Firm* — IP Business Solutions, LLC

(57) ABSTRACT

A switch unit includes: a plurality of switches; a panel on which the plurality of switches are arranged side by side along one direction; and an attachment assembled to the panel in a state that at least one of the switches is assembled thereto. The panel is formed in a manner that a surface thereof bends along a parallel direction, which is a direction that the plurality of switches line up. The attachment has wall surface parts assembled to the switch so as to surround the switch. A side face part along the parallel direction of the panel has an engagement part. Among the wall surface parts of the attachment, a side wall surface part facing the side face part in a state that the attachment is assembled to the panel has an engaged part with which the engagement part is engaged.

5 Claims, 8 Drawing Sheets

SWITCH UNIT

INCORPORATION BY REFERENCE

This application is based upon and claims the benefit of priority from Japanese patent application No. 2022-058116, filed on Mar. 31, 2022, the disclosure of which is incorporated herein in its entirety by reference.

TECHNICAL FIELD

The present invention relates to a switch unit.

BACKGROUND ART

Various switches are provided on a panel inside a vehicle such as an automobile. For example, a plurality of power window switches are provided on a door panel in a vehicle. The switches are attached to the panel by covering the surfaces of the switches with the panel and fitting the surrounding wall part of the panel to the side faces of the switches.

Patent Document 1: Japanese Unexamined Patent Application Publication No. JP-A 2000-268654

As described in Patent Document 1, a plurality of switches may be arranged at different angles. In this case, a panel to which the switches are attached has a bent shape. In a case where the switches are attached in a manner that the surrounding wall part of the panel is fitted to the side faces of the switches as described above, the wall part of the panel may be undercut due to the structure of a molding die, and it may occur that the panel cannot be molded. For this reason, the panel needs to be newly designed to prevent an undercut, and the switches may also need to be newly designed so as to be attached to the new panel, which causes a problem of cost and time.

SUMMARY OF THE INVENTION

Accordingly, an object of the present invention is to solve the abovementioned problem that a structure in which a plurality of switches are attached to a panel at different angles needs cost and time.

Another object of the present invention is to solve the problem that a switch attachment part needs to be newly designed every time the angle of the panel changes.

A switch unit as an aspect of the present invention includes: a plurality of switches; a panel on which the plurality of switches are arranged side by side along one direction and an operation part of each of the switches is exposed from an opening part formed on a surface thereof; and an attachment assembled to the panel in a state that at least one of the switches is assembled thereto. The panel is formed in a manner that the surface bends along a parallel direction, which is a direction that the plurality of switches line up. The attachment has wall surface parts assembled to the switch so as to surround the switch. A side face part along the parallel direction of the panel has an engagement part. Among the wall surface parts of the attachment, a side wall surface part facing the side face part in a state that the attachment is assembled to the panel has an engaged part with which the engagement part is engaged.

With the configuration as described above, the present invention enables reduction of the cost and time for manufacturing even in the case of a structure in which a plurality of switches are attached to a panel at different angles. Moreover, the present invention enables use of the same switches by means of an attachment regardless of the angle of the panel, that is, enables diversion to and share with various types of vehicles.

EXAMPLE EMBODIMENT

First Example Embodiment

Figure 1:
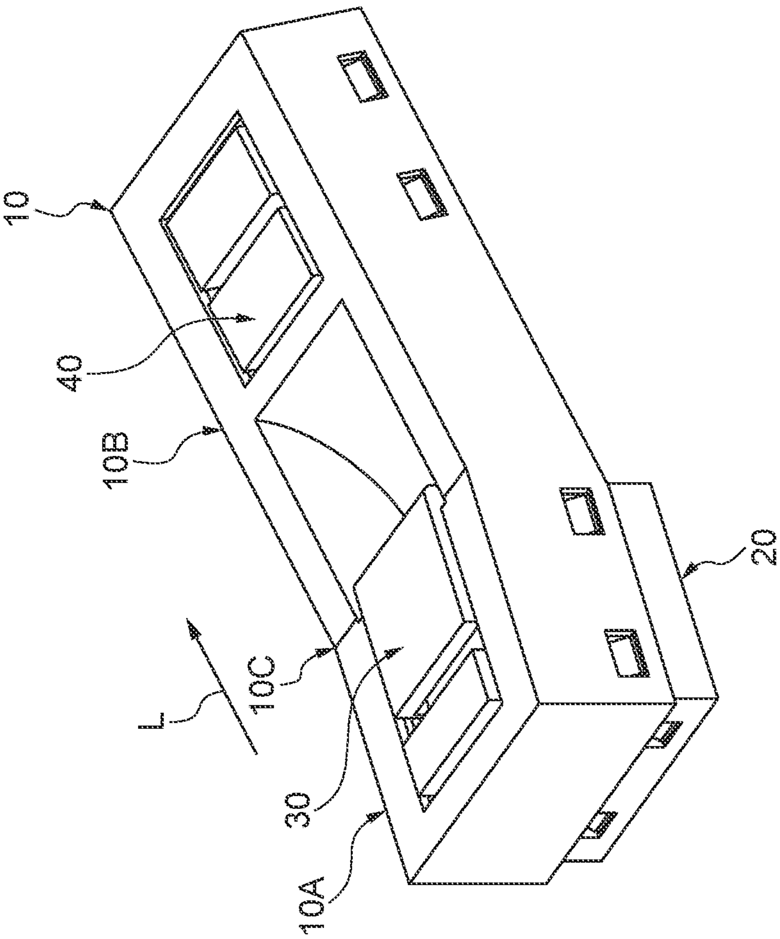
FIG. 1 is a figure showing a configuration of a switch unit in a first example embodiment of the present invention.
Figure 2:
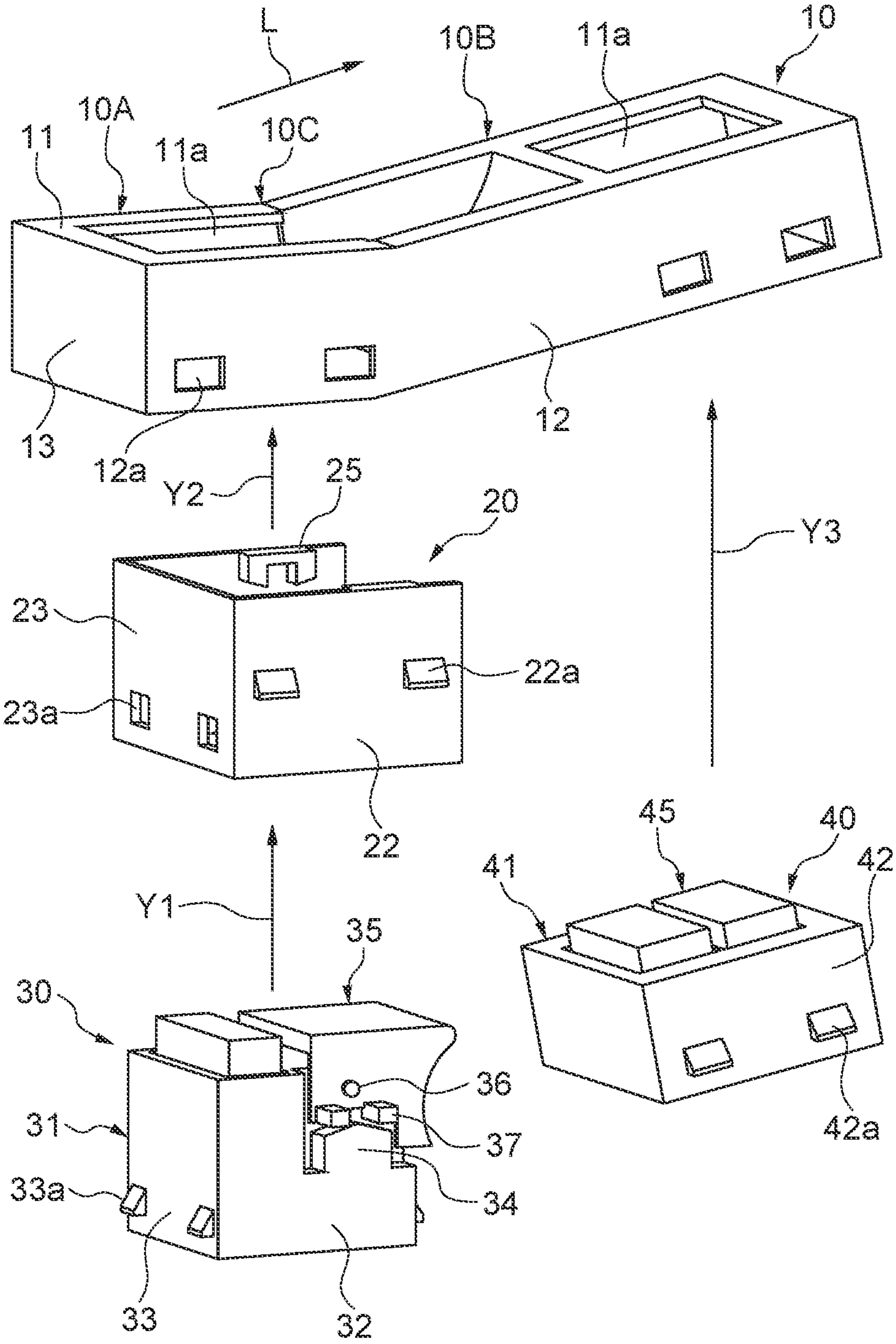
FIG. 2 is an exploded diagram of the switch unit disclosed in FIG. 1.

A first example embodiment of the present invention will be described with reference to FIGS. 1 to 6. FIGS. 1 to 2 are figures for describing a configuration of the whole switch unit, and FIGS. 3 to 6 are figures for describing a configuration of each part of the switch unit.

[Configuration]

The switch unit according to the present invention has a configuration in which a switch is attached to a panel provided inside a vehicle such as an automobile. For example, a switch unit having a configuration in which a plurality of switches such as power window switches are attached to a door panel in a vehicle will be described as an example in this example embodiment. However, the switch unit according to the present invention may be a switch unit mounted on any part of a vehicle, or may be a switch unit mounted on any device, not limited to a vehicle.

FIG. 1 shows a perspective view of a switch unit in an assembled state. An exploded diagram of the switch unit in an exploded state is shown in FIG. 2. As shown in FIGS. 1 and 2, the switch unit is configured by assembling a panel 10, an attachment 20, and a plurality of switches 30 and 40. The respective components will be described in detail below.

Figure 3:
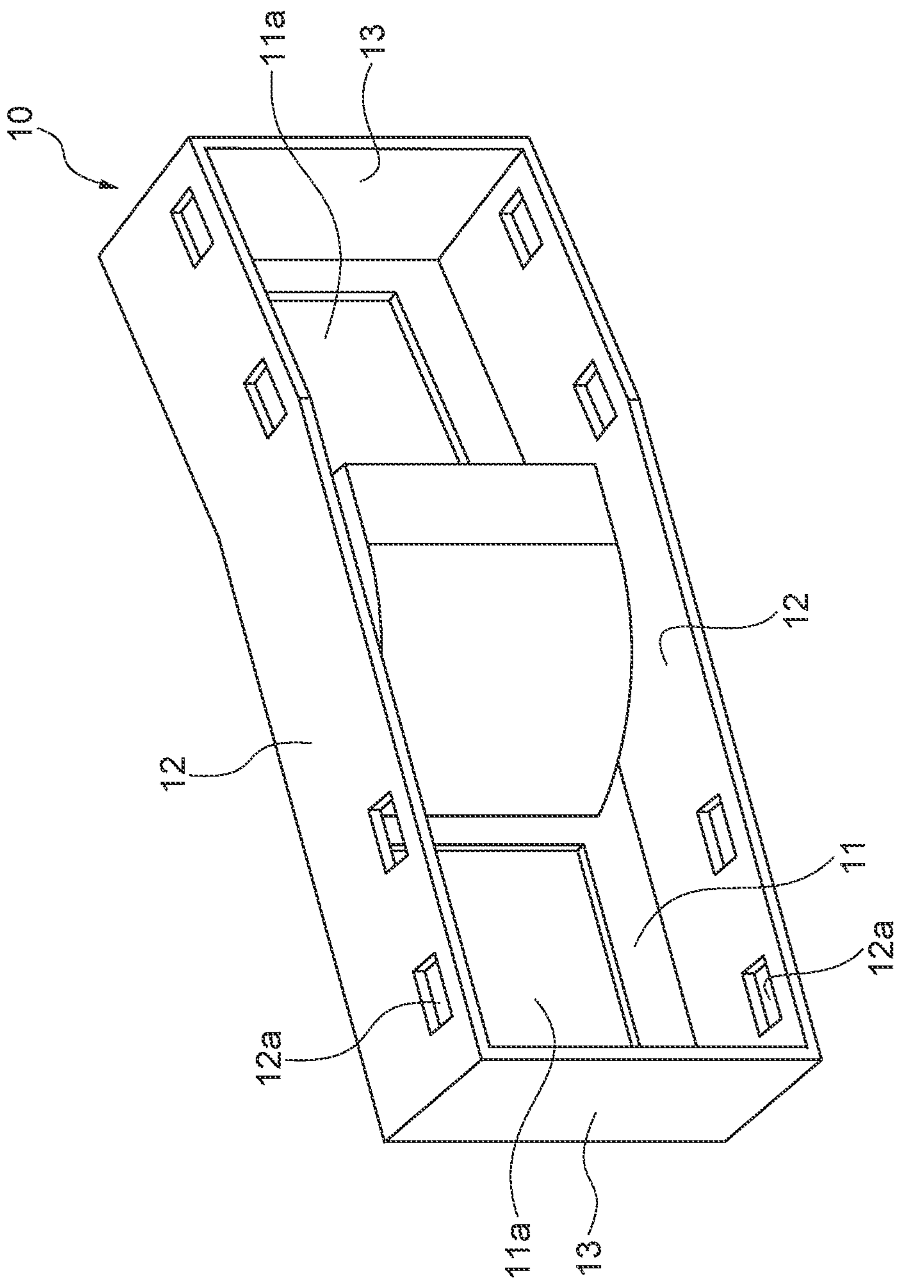
FIG. 3 is a figure showing a configuration of a panel in the switch unit disclosed in FIG. 1.

First, a configuration of the panel 10 will be described with reference to FIGS. 2 and 3. A side facing up in FIG. 2 is defined as a surface side of the panel 10, and FIG. 3 shows a figure of the panel 10 viewed from a back side thereof. Moreover, in FIG. 2, a left side is defined as one side and a right side is defined as the other side.

The panel 10 has a plate-like surface part 11 whose outers shape is formed in a substantially rectangular shape, and has a pair of side face parts 12 facing each other and a pair of side face parts 13 facing each other that are set up on the periphery of the surface part 11 so as to extend toward the back side. The surface part 11 is formed so as to bend along a longitudinal direction L in the substantially rectangular shape. Specifically, the surface part 11 has a bent part 10C formed at a predetermined position in the longitudinal direction L, and a one-side surface part 10A located on one side of the longitudinal direction L and an other-side surface part 10B located on the other side are formed with the bent part 10C as a boundary. In particular, in this example embodiment, a face of the other-side surface part 10B forms a predetermined angle with respect to a face of the one-side surface part 10A, and the surface part 11 bends in a concave shape with the bent part 10C as a boundary. Meanwhile, the surface part 11 may bend in a convex shape with the bent part 10C as a boundary.

Further, an opening part 11*a* is formed on the surface part 11 of the panel 10. Specifically, two opening parts 11*a* arranged side by side along the longitudinal direction L are formed on the surface part 11 of the panel 11. In particular, in this example embodiment, one opening part 11*a* is formed on each of the one-side surface part 10A and the other-side surface part 10B of the surface part 11. Then, the switches 30 and 40 are assembled to the panel 10 from the back side so that operation parts 35 and 45 of the switches 30 and 40 are exposed on the surface side as will be described later. For this reason, in the switch unit, the plurality of switches 30 and 40 are arranged side by side along one direction, and the longitudinal direction L (substantially horizontal direction in FIG. 2) of the surface part 11 having a substantially rectangular shape becomes a parallel direction that is an arrangement direction of the plurality of switches 30 and 40.

Although this example embodiment shows a case where two opening parts 11*a* are formed on the surface part 11 of the panel 10, three or more opening parts 11*a* may be formed and three or more switches may be assembled. In this case, on either or both of the one-side surface part 10A and the other-side surface part 10B of the panel 10, a plurality of opening parts 11*a* may be formed and a plurality of switches may be assembled so as to correspond, respectively.

Further, the side face parts 12 and 13 of the panel 10 are provided so as to correspond to the four sides of the substantially rectangular surface part 11, respectively, and are formed of four side face parts 12 and 13. Specifically, the side face parts 12 and 13 include two first side face parts 12 that are respectively connected to the long sides of the substantially rectangular surface part 11 and located along the longitudinal direction L of the panel 10 so as to face each other, and two second side face parts 13 that are respectively connected to the short sides of the substantially rectangular surface part 11 and located at the respective ends in the longitudinal direction L of the panel 10 so as to face each other. On the first side face part 12, a plurality of engagement parts 12*a* formed by rectangular through holes piercing in the thickness direction are formed. The engagement part 12*a* on the one side (left side in FIG. 2) with the bent part 10C of the panel 10 as a boundary is engaged with the attachment 20 assembled to the switch 30 as will be described later, and the engagement part 12*a* on the other side (right side in FIG. 2) with the bent part 10C of the panel 10 as a boundary is engaged with the switch 40. That is to say, between the two first side face parts 12 located so as to face each other, the attachment 20 assembled with the switch 30 and the switch 40 are arranged, and the faces of the attachment 20 and the switch 40 facing the inside surfaces of the first side face parts 12 are engaged with the respective first side face parts 12.

Next, with reference to FIGS. 2 and 4, a configuration of the attachment 20 will be described. The attachment 20 is attached to the periphery of the switch 30 and, as shown in FIG. 2, has wall surface parts 22 and 23 surrounding the switch 30. That is to say, the wall surface parts 22 and 23 are configured so that four plate members are connected like a tube, and are assembled with the switch 30 inserted therein. Moreover, the attachment 20 is assembled with the one-side surface part 10A of the panel 10 with the switch 30 assembled thereto. The four wall surface parts 22 and 23 of the attachment 20 include two first wall surface parts 22 (side wall surface parts) respectively facing and being engaged with the first side face parts 12 along the longitudinal direction L of the panel 10, and two second wall surface parts 23 (second wall surface parts) respectively connecting the end parts in the longitudinal direction L of the first wall surface parts 22. Therefore, the two second wall surface parts 23 are provided along a direction intersecting the longitudinal direction L of the panel 10, one of which faces the inside surface of the second side face part 13 located at the end part on the one side in the longitudinal direction L of the panel 10. The left view of FIG. 4 is a front view of the attachment 20 with the wall surface part 23 (one-side wall surface part 23) facing the second side face part 13 located at the one-side end part of the panel 10 as the front, and the right view of FIG. 4 is a perspective view of the attachment 20 seen from the back side.

Figure 4:
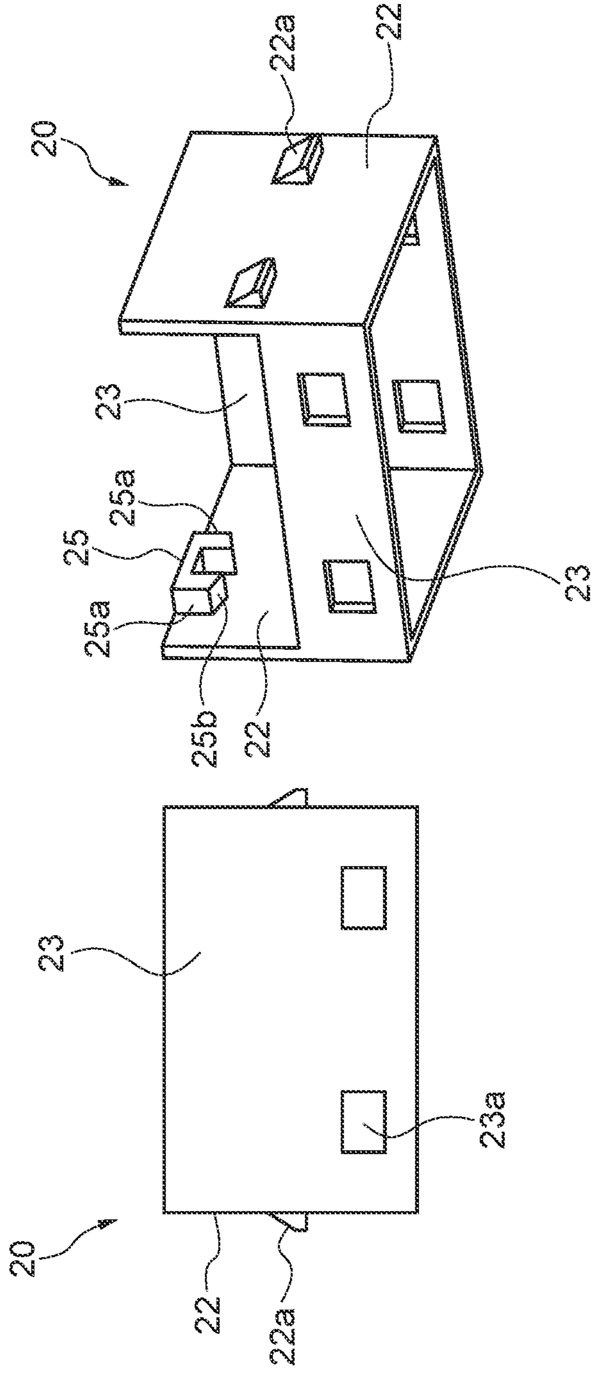
FIG. 4 is a figure showing a configuration of an attachment in the switch unit disclosed in FIG. 1.

As shown in FIGS. 2 and 4, a plurality of claw parts 22*a* (engaged parts) protruding outward are formed on the first wall surface parts 22 of the attachment 22. The claw part 22*a* is formed protruding so that the protruding height gradually increases from the top to the bottom. Then, the claw part 22*a* is inserted into and engaged with the engagement part 12*a* that is a through hole formed on the first side face part 12 of the panel 10 described above. Moreover, the second wall surface parts 23 of the attachment 20 are formed so that the height of the other-side wall surface part 23 is lower than that of the one-side wall surface part 23. Then, a plurality of switch engagement parts 23*a* (second engagement parts) formed by rectangular through holes penetrating in the thickness direction are formed on the second wall surface part 23.

Further, as shown in FIGS. 2 and 4, a restriction part 25 protruding inward is formed in the vicinity of the upper end of the inside surface of the first wall surface part 22. The restriction part 25 has two branch parts 25*a* branching and extending downward, and a lower end face 25*b* of each of the branch parts 25*a* functions to restrict the swing of an operation part 35 of the switch 30 as will be described later.

Figure 5:
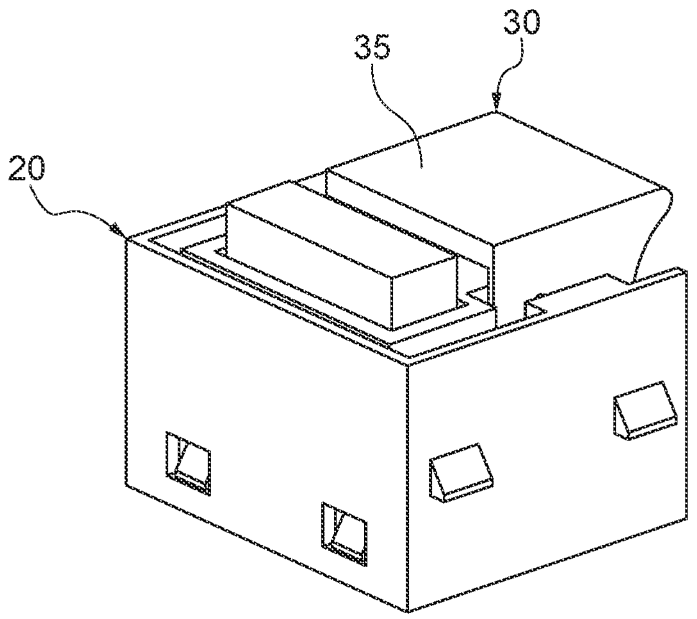
FIG. 5 is a figure showing a configuration in which the switch and the attachment are assembled in the switch unit disclosed in FIG. 1.
Figure 6:
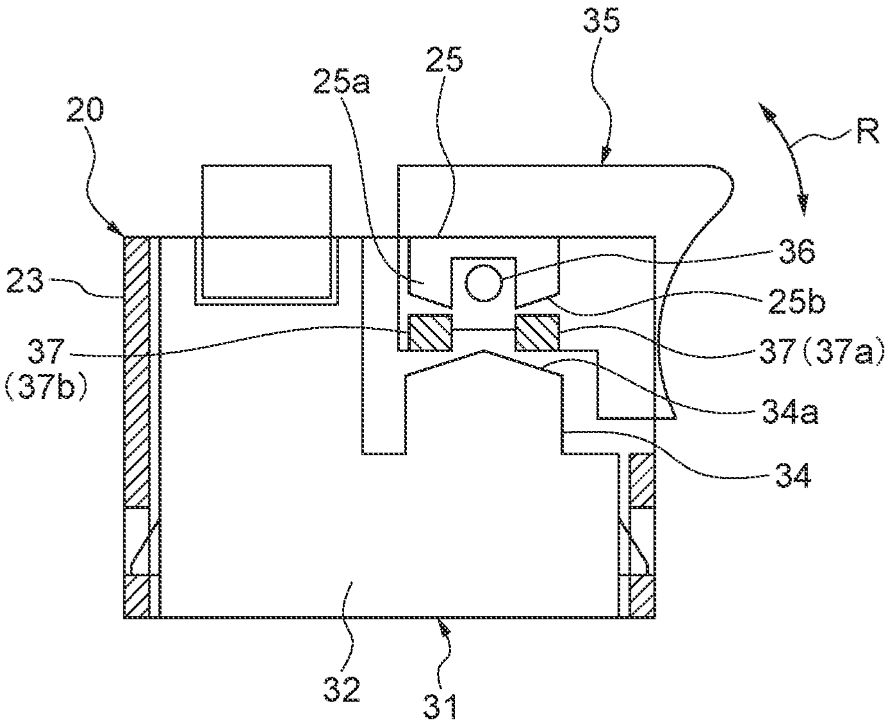
FIG. 6 is a partial cross-section view of the assembled switch and attachment in the switch unit disclosed in FIG. 1.

Next, the configurations of the switches 30 and 40 will be described with reference to FIGS. 2, 5, and 6. First, the switch 30 attached to the attachment 20 will be described. FIG. 5 shows a perspective view of the switch 30 attached to the attachment 20, and FIG. 6 shows a schematic cross-section view of the switch 30 attached to the attachment 20. Specifically, FIG. 6 shows the outline of the cross section near the first wall surface part 22 of the attachment 20 along the longitudinal direction L of the panel 10, and a line that does not appear originally is also indicated by a solid line.

As shown in FIG. 2, the switch 30 includes a switch main body 31, and the operation part 35 attached thereto so as to be swingable. In the example shown in FIG. 2, the switch main body 31 is formed in a substantially rectangular parallelepiped shape, and has four side faces 32 and 33. Specifically, the four side faces 32 and 33 include two first switch side faces 32 that are located along the longitudinal direction L of the panel 10 and face and are engaged with the first wall surface parts 22 of the attachment 20, respectively, and two second switch side faces 33 that are located on one side and the other side of the switch main body 31 in the longitudinal direction L of the panel 10, respectively, and face and are engaged with the second wall surface parts 23 of the attachment 20, respectively.

As shown in FIG. 2, a plurality of switch-side claw parts 33*a* (second engaged parts) protruding outward are formed on the second switch side faces 33 of the switch main body 31. The switch-side claw part 33*a* is formed protruding so that the protrusion height gradually increases from the top to the bottom. Then, the switch-side claw part 33*a* is inserted into and engaged with the switch engagement part 23*a* that is a through hole formed on the second wall surface part 23 of the attachment 20 described above.

Further, as shown in FIGS. 2 and 6, the operation part 35 forming an operation face of the switch 30 is provided above the switch main body 31. Thus, a swing shaft 36 that pivotally supports the operation part 35 in a swingable manner is provided on the first switch side face 32 of the switch main body 31. The swing shaft 36 is located extending in a direction substantially orthogonal to the longitudinal direction L of the panel 10. Since the operation part 35 is provided so as to be pivotally supported by the swing shaft 36, the operation part 35 can swing as indicated by arrow R in FIG. 6. Specifically, the operation part 35 can be operated so that an end part of the operation part 35 on the other side in the longitudinal direction of the panel 10 is pushed down and pulled up, and swings in a rotation direction around the swing shaft 36.

Further, as shown in FIGS. 2 and 6, an abutment part 37 protruding further outward is provided on the side face of the operation part 35 facing the first wall surface part 22 of the attachment 20. Specifically, the abutment part 37 is formed by two protruding pieces located so as to have the swing shaft 36 therebetween, below a site of the operation part 35 pivotally supported by the swing shaft 36. As shown in FIG. 6, when the switch 30 is assembled to the attachment 20, the two abutment parts 37 are located further below the lower end faces 25*b* of the two branch parts 25 of the restriction part 25 provided on the first wall surface part 22 of the attachment 20, with a predetermined space from the lower end faces 25*b*.

Further, as shown in FIGS. 2 and 6, a second restriction part 34 located below the abutment part 37 of the operation part 35 mounted as described above and protruding upward is provided on the first switch side face 32 of the switch main body 31. Specifically, as shown in FIG. 6, when the operation part 35 is mounted on the switch main body 31, an upper end face 34*a* of the second restriction part 34 is formed so as to be arranged with a predetermined space from the abutment parts 37, further below the two abutment parts 37 of the operation part 35. In particular, the upper end face 34*a* of the second restriction part 34 is formed by two sloped surfaces and formed at a position where the two sloped surfaces face the abutment parts 37, respectively.

Next, the switch 40 directly attached to the panel 10 without being attached to the attachment 20 will be described with reference to FIG. 2. As shown in FIG. 2, the switch 40 includes a switch main body 41 and an operation part 45. In the example shown in FIG. 2, the switch main body 41 is formed in a substantially rectangular parallelepiped shape, and has four side face surfaces 42. Of the four side faces 42, two side faces 42 that are located along the longitudinal direction L of the panel 10 and that face and are engaged with the first side face parts 12 of the panel 10 each have a plurality of switch-side claw parts 42*a* formed so as to protrude outward. The switch-side claw part 42*a* is formed so as to protrude in a manner that the protrusion height thereof gradually increases from the top to the bottom. Then, the switch-side claw part 42*a* is inserted into and engaged with the engagement part 12*a* that is a through hole formed on the first side face part 12 of the panel 10 described above.

[Assembly]

Next, the assembly of the switch unit configured in the abovementioned manner will be described. First, as indicated by arrow Y1 in FIG. 2, the switch 30 is inserted into the attachment 20 from below the attachment 20. The switch-side claw part 33*a* formed on the second switch side face 33 of the switch 30 is inserted into and engaged with the switch engagement part 23*a* that is a through hole formed on the second wall surface part 23 of the attachment 20. Consequently, as shown in FIG. 5, the attachment 20 is attached to the periphery of the switch 30.

Here, a motion of the operation part 35 of the switch 30 will be described with reference to FIG. 6. Since the operation part 35 is pivotally supported by the swing shaft 36 provided extending in a direction that is substantially orthogonal to the longitudinal direction L of the panel 10, the operation part 35 can swing as indicated by arrow R in FIG. 6. Specifically, the operation part 35 swings in a rotation direction around the swing shaft 36 when an end part thereof on the other side in the longitudinal direction of the panel 10 is pulled up or pushed down. The abutment part 37 provided on the operation part 35 swings with the swing of the operation part 35. Specifically, the two protrusion pieces composing the abutment part 37 move in the opposite direction each other by the swing of the operation part 35. That is to say, when one abutment part 37*a* (first abutment part) moves upward, the other abutment part 37*b* (second abutment part) moves downward. Then, the one abutment part 37*a* abuts on the lower end face 25*b* of the branch part 25*a* of the restriction part 25 formed on the first wall surface part 22 of the attachment 20 after moving upward by a predetermined distance by the swing, and the other abutment part 37*b* abuts on the upper end face 34*a* of the second restriction part 34 formed on the switch main body 31 after moving downward by a predetermined distance by the swing. Thus, the operation part 35 moves like a seesaw around the swing shaft 36. On the other hand, when the one abutment part 37*a* moves downward, the other abutment part 37*b* moves upward. In this case, the one abutment part 37*a* abuts on the upper end face 34*a* of the second restriction part 34 formed on the switch main body 31 after moving downward by a predetermined distance by the swing, and the other abutment part 37*b* abuts on the lower end face 25*b* of the branch part 25*a* of the restriction part 25 formed on the first wall surface part 22 of the attachment 20 after moving upward by a predetermined distance by the swing. Thus, in the swing motion of the operation part 35, the operation part 35 is allowed to swing by a predetermined rotation angle and restricted so as not to swing beyond the angle. Moreover, since the one abutment part 37*a* and the other abutment part 37*b* always abut on the lower end face 25*b* of the restriction part 25 or the upper end face 34*a* of the second restriction part 34 at the time of the swing, operation stress when the operation part 35 is operated can be distributed. Consequently, damage to the operation part 35 is restricted.

Subsequently, as indicated by arrow Y2 in FIG. 2, the attachment 20 with the switch 30 assembled is inserted from below the one-side surface part 10A of the panel 10. Here, the claw part 22*a* formed on the first wall surface part 22 of the attachment 20 is inserted into and engaged with the engagement part 12*a* that is a though hole formed on the first side face part 12 of the panel 10. Consequently, as shown in FIG. 1, the switch 30 is attached to the one-side surface part 10A of the panel 10 via the attachment 20.

Further, as indicated by arrow Y3 in FIG. 2, the switch 40 is inserted from below the other-side surface part 10B of the panel 10. Here, the switch-side claw parts 42*a* formed on the two side faces 42 of the switch 40 are inserted into and engaged with the engagement parts 12*a* that are through holes formed on the first side face parts 12 of the panel 10. Consequently, as shown in FIG. 1, the switch 40 is attached to the other-side surface part 10B of the panel 10.

As described above, according to this example embodiment, by assembling the attachment 20 to the switch 30 and then assembling the attachment 20 to the first side face part 12 that is along the longitudinal direction L of the panel 10, the switch 30 can be assembled to the panel 10 via the attachment 20. Consequently, there is no need for forming a part for engagement with the switch 30 on the second side face part 13 located at the end part in the longitudinal direction L of the panel 10. As a result, even when the panel 10 is formed in a bent shape so that a plurality of switches are arranged at different angles, the existing switch 30 can be used by newly designing the panel 10 so that no undercut is generated on the side face part of the panel 10, and the manufacturing cost and time can be suppressed.

Second Example Embodiment

Next, a second example embodiment of the present invention will be described with reference to FIGS. 7 and 8. A configuration different from in the switch unit of the first example embodiment will be mainly described below.

[Configuration]

Figure 7:
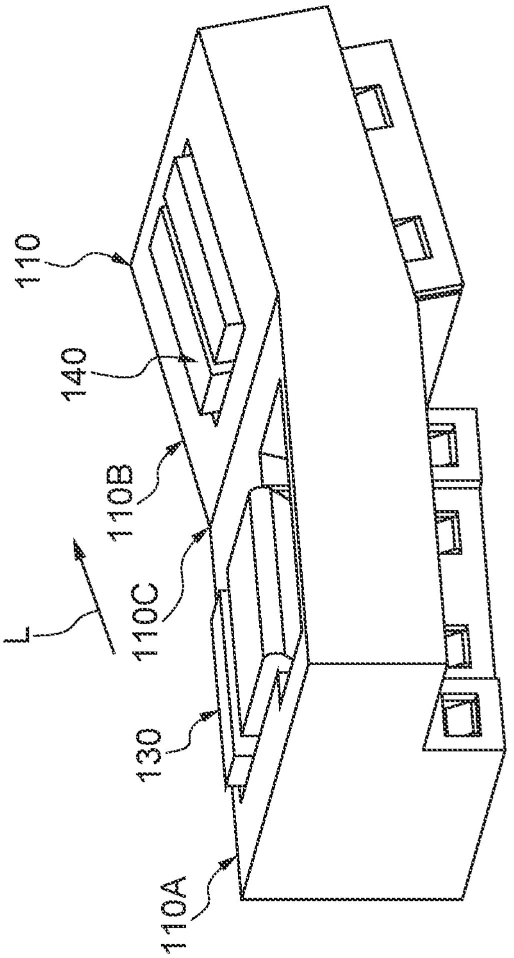
FIG. 7 is a figure showing a configuration of a switch unit in a second example embodiment of the present invention.

FIG. 7 shows a perspective view of a switch unit in an assembled state in this example embodiment. FIG. 8 shows an exploded diagram of the switch unit in an exploded state. As shown in FIGS. 7 and 8, the switch unit is configured by assembling a panel 110, an attachment 120, and a plurality of switches 130 and 140. Below, the respective components will be described in detail.

The panel 110 has a plate-like surface part 111 whose outer shape is formed in a substantially rectangular shape, and has wall surface parts 112 and 113 set up at the periphery of the surface part 111 so as to extend toward the back side. As in the first example embodiment, the surface part 111 is formed so as to bend along the longitudinal direction L of the substantially rectangular shape, and a one-side surface part 110A located on the one side in the longitudinal direction L and an other-side surface part 110B located on the other side are formed with a bent part 110C as a boundary. The, one opening part 111*a* is formed on each of the one-side surface part 110A and the other-side surface part 110B of the surface part 111. Thus, in the switch unit according to this example embodiment as well, the plurality of switches 130 and 140 are arranged side by side along one direction, and the longitudinal direction L (substantially horizontal direction in FIG. 7) of the substantially rectangular surface part 111 is a parallel direction in which the plurality of switches 130 and 140 are arranged.

Further, the side face parts 112 and 113 of the panel 110 are provided corresponding to the four sides of the substantially rectangular surface part 111, respectively. Among them, of the two first side face parts 112 located along the longitudinal direction L of the panel 110, one first side face part 112 shown on the front side in FIGS. 7 and 8 is formed with a step. That is to say, the one first side face part 112 is formed in a manner that a portion on the opposite side to the surface part side is located closer to the other first side face part 112 than a portion on the surface part side. On the one first side face part 112, a plurality of engagement parts 112*a* formed of rectangular through holes penetrating in the thickness direction are formed as in the first example embodiment.

Figure 8:
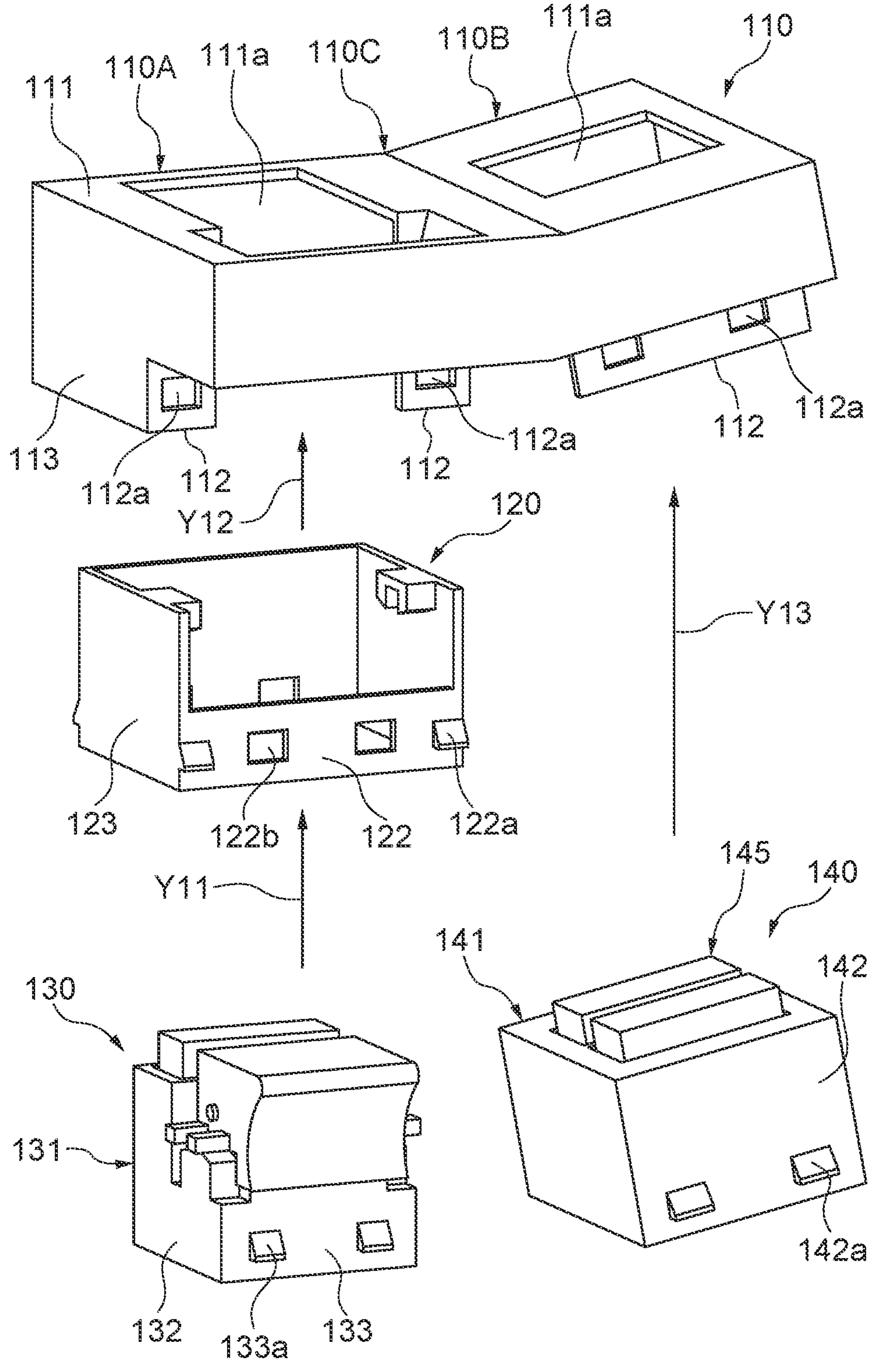
FIG. 8 is an exploded diagram of the switch unit disclosed in FIG. 7.

The attachment 120 is assembled to the periphery of the switch 130, and has wall surface parts 122 and 123 surrounding the switch 130 as shown in FIG. 8. The wall surface parts 122 and 123 includes two first wall surface parts 122 (side wall surface parts) that face and engage with the respective first side face parts 112 along the longitudinal direction L of the panel 110, and two second wall surface parts 123 (second wall surface parts) connecting both end parts in the longitudinal direction L of the two first wall surface parts 122.

The first wall surface part 122 of the attachment 120 has a plurality of claw parts 122*a* (engaged parts) formed protruding outward. The first wall surface part 122 also has a plurality of switch engagement parts 123*a* (second engagement parts) formed of rectangular through holes penetrating in the thickness direction. That is to say, in this example embodiment, unlike in the first embodiment, the two second wall surface parts 123 connecting both the end parts in the longitudinal direction L of the two first wall surface parts 122 do not have switch engagement parts 123*a* formed of through holes.

As shown in FIG. 8, the switch 130 includes a switch main body 131 and an operation part 135, and is the same switch as the switch 30 of the first example embodiment. In this example embodiment, a direction to assemble the switch 130 to the panel 110 is different from in the first example embodiment. The switch main body 131 is formed in a substantially rectangular parallelepiped shape, and has four side faces. Of the four side faces, two second switch side faces 133 that are located along the longitudinal direction L of the panel 110 and that face and are engaged with the respective first wall surface parts 122 of the attachment 120 have a plurality of switch-side claw parts 133*a* (second engaged parts) formed protruding outward. That is to say, in this example embodiment, as in the first example embodiment, the switch-side claw part are not formed on the first switch side faces 132 that are different from the second switch side faces 133 described above.

The switch 140 includes a switch main body 141 and an operation part 145 as shown in FIG. 8. The switch main body 141 is formed in a substantially rectangular parallelepiped shape, and has four side faces. Of the four side faces, two side faces 142 that are located along the longitudinal direction L of the panel 110 and that face and are engaged with the respective first side face parts 112 of the panel 110 have a plurality of switch-side claw parts 142*a* formed protruding outward.

[Assembly]

Next, the assembly of the switch unit configured in the abovementioned manner will be described. First, as indicated by arrow Y11 in FIG. 8, the switch 130 is inserted into the attachment 120 from below the attachment 120. Here, the switch-side claw part 133*a* formed on the second switch side face 133 of the switch 130 is inserted into and engaged with the switch engagement part 122*b* that is a through hole formed on the first wall surface part 122 of the attachment 120. Consequently, the attachment 120 is attached to the periphery of the switch 30.

Subsequently, as indicated by arrow Y12 in FIG. 8, the attachment 120 with the switch 130 assembled is inserted from below the one-side surface part 110A of the panel 110. Here, the claw part 122*a* formed on the first wall surface part

122 of the attachment 120 is inserted into and engaged with the engagement part 112*a* that is a though hole formed on the first side face part 112 of the panel 110. Consequently, as shown in FIG. 7, the switch 130 is assembled to the one-side surface part 110A of the panel 110 via the attachment 120.

Further, as indicated by arrow Y13 in FIG. 8, the switch 140 is inserted from below the other-side surface part 110B of the panel 110. Here, the switch-side claw parts 142*a* formed on the two side faces 142 of the switch 140 are inserted into and engaged with the engagement parts 112*a* that are through holes formed on the first side face part 112 of the panel 10. Consequently, as shown in FIG. 7, the switch 140 is assembled to the other-side surface part 10B of the panel 110.

As described above, according to this example embodiment as well, the attachment 120 is assembled to the switch 130 and then the attachment 120 is assembled to the first side face part 112 that is along the longitudinal direction L of the panel 110. Consequently, there is no need for forming a part for engagement with the switch 130 on the second side face part 113 located at the end part in the longitudinal direction L of the panel 110. As a result, even when the panel 110 is formed in a bent shape so that a plurality of switches are arranged at different angles, the existing switch 30 can be used by newly designing the panel 10 so that no undercut is generated on the side face part of the panel 10, and the manufacturing cost and time can be suppressed.

<Supplementary Notes>

The whole or part of the example embodiments disclosed above can be described as the following supplementary notes. Below, the overview of a switch unit according to the present invention will be described. However, the present invention is not limited to the following configurations.

(Supplementary Note 1)

A switch unit comprising:

a plurality of switches;

a panel on which the plurality of switches are arranged side by side along one direction and an operation part of each of the switches is exposed from an opening part formed on a surface thereof; and an attachment assembled to the panel in a state that at least one of the switches is assembled thereto, wherein:

the panel is formed in a manner that the surface bends along a parallel direction, which is a direction that the plurality of switches line up;

the attachment has wall surface parts assembled to the switch so as to surround the switch;

a side face part along the parallel direction of the panel has an engagement part; and among the wall surface parts of the attachment, a side wall surface part facing the side face part in a state that the attachment is assembled to the panel has an engaged part with which the engagement part is engaged.

(Supplementary Note 2)

The switch unit according to Supplementary Note 1, wherein:

among the wall surface parts of the attachment, a second wall surface part that is provided in a direction intersecting the parallel direction and connects end parts in the parallel direction of the side wall surface parts has a second engagement part; and the switch has, at a site facing the second wall surface part in a state that the switch is assembled to the attachment, a second engaged part with which the second engagement part is engaged.

(Supplementary Note 3)

The switch unit according to Supplementary Note 1, wherein:

the side wall surface part of the attachment has a second engagement part; and the switch has, at a site facing the side wall surface part in a state that the switch is assembled to the attachment, a second engaged part with which the second engagement part is engaged.

(Supplementary Note 4)

The switch unit according to any of Supplementary Notes 1 to 3, wherein at least one of the switches is installed on each of one side and other side along the parallel direction with a bent portion of the panel as a boundary.

(Supplementary Note 5)

The switch unit according to any of Supplementary Notes 1 to 4, wherein:

the operation part of the switch assembled to the attachment can be operated to swing, and has an abutment part that swings with the swing of the operation part;

the side wall surface part has a restriction part that restricts the swing of the operation part by abutment of the abutment part;

the abutment part includes a first abutment part and a second abutment part that move in opposite directions each other by the swing of the operation part;

the switch has a second restriction part that restricts the swing of the operation part by abutment of the abutment part; and the second abutment part abuts on the second restriction part when the first abutment part abuts on the restriction part, and the second abutment part abuts on the restriction part when the first abutment part abuts on the second restriction part.

Although the present invention has been described above with reference to the example embodiments and so on, the present invention is not limited to the above example embodiments. The configurations and details of the present invention can be changed in various manners that can be understood by one skilled in the art within the scope of the present invention.

EXPLANATION OF REFERENCE NUMERALS

10 panel
10A one-side surface part
10B other-side surface part
11 surface part
11*a* opening part
12 first side face part
12*a* engagement part
13 second side face part
20 attachment
22 first wall surface part
22*a* claw part
23 second wall surface part
23*a* switch engagement part
25 restriction part
25*a* branch part
25*b* lower end face
30 switch
31 switch main body
32 first switch side face
33 second switch side face
33*a* switch-side claw part
34 second restriction part
34*a* upper end face

35 operation part
36 swing shaft
37 abutment part
40 switch
41 switch main body
42 side face
42*a* switch-side claw part
45 operation part
110 panel
110A one-side surface part
110B other-face surface part
111 surface part
111*a* opening part
112 first side face part
112*a* engagement part
113 second side face part
120 attachment
122 first wall surface part
122*a* claw part
122*b* switch engagement part
123 second wall surface part
130 switch
131 switch main body
132 first switch side face
133 second switch side face
133*a* switch-side claw part
140 switch
141 switch main body
142 side face
142*a* switch-side claw part
145 operation part

The invention claimed is:

1. A switch unit comprising:

a plurality of switches including a first switch and a second switch;

a panel on which the plurality of switches are arranged side by side along one direction and an operation part of each of the first and second switches is exposed from an opening part formed on a surface thereof; and an attachment being a separate member from the panel and assembled to the panel in a state that at least one of the first and second switches is assembled thereto, wherein:

the panel is formed in a configuration that the surface bends along a parallel direction, which is a direction that first and second switches line up;

the attachment has wall surface parts assembled to the first switch so as to surround the first switch;

a side face part along the parallel direction of the panel has a first engagement part; and among the wall surface parts of the attachment, a side wall surface part facing the side face part in a state that the attachment is assembled to the panel has an engaged part with which the first engagement part is engaged.

2. The switch unit according to claim 1, wherein:

among the wall surface parts of the attachment, a second wall surface part that is provided in a direction intersecting the parallel direction and connects end parts in the parallel direction of the side wall surface parts has a second engagement part; and the first switch has, at a site facing the second wall surface part in a state that the first switch is assembled to the attachment, a second engaged part with which the second engagement part is engaged.

3. The switch unit according to claim 1, wherein:

the side wall surface part of the attachment has a second engagement part; and the first switch has, at a site facing the side wall surface part in a state that the first switch is assembled to the attachment, a second engaged part with which the second engagement part is engaged.

4. The switch unit according to claim 1, wherein at least one of the first and second switches is installed on each of one side and other side along the parallel direction with a bent portion of the panel as a boundary.

5. The switch unit according to claim 1, wherein:

the operation part of the first switch assembled to the attachment can be operated to swing, and has an abutment part that swings with the swing of the operation part;

the side wall surface part has a first restriction part that restricts the swing of the operation part by abutment of the abutment part;

the abutment part includes a first abutment part and a second abutment part that move in opposite directions of each other by the swing of the operation part;

the first switch has a second restriction part that restricts the swing of the operation part by abutment of the first and second abutment parts-part; and the second abutment part abuts on the second restriction part when the first abutment part abuts on the first restriction part, and the second abutment part abuts on the first restriction part when the first abutment part abuts on the second restriction part.

* * * * *